2,863,906

α,β-DICHLORO-γ,γ,γ-TRIFLUOROCROTONIC ACID AND DERIVATIVES THEREOF

Charles F. Baranauckas and William E. Ashton, Niagara Falls, N. Y., assignors to Hooker Chemical Corporation, Niagara Falls, N. Y., a corporation of New York No Drawing. Application June 17, 1955
Serial No. 516,304

6 Claims. (Cl. 260—465.7)

This invention relates to a new and useful class of chlorofluorocarbon acids and their derivatives which are useful as chemical intermediates.

Our new chlorofluorocarbon compounds are unsaturated chlorofluorocarbon monocarboxylic acids and their derivatives. These compounds possess decided fluorocarbon characteristics combined with properties attributable to the active non-fluorocarbon group associated therewith.

The compounds of this invention can be represented by the following general class formula: R—CCl=CCl—Z, where R is a perhalocarbon radical unreactive to sulfuric acid and Z is a monocarboxyl radical selected from the group consisting of acids, acid anhydrides, acid halides (fluorides, chlorides, bromides and iodides), salts, esters, amides and nitriles, or a carbon-containing derivative radical hydrolyzable thereto.

We have discovered a simple and economical process for making these compounds which comprises reacting a selected perhalocarbon with sulfuric acid at elevated temperatures to form the desired acid.

More particularly, 1,1,1,2,3-pentachloro-4,4,4-trifluorobutene-2 (which is prepared as exemplified hereinafter and is disclosed and claimed in our copending application S. N. 516,303, filed June 17, 1955, now Patent No. 2,830,098), is reacted with concentrated sulfuric acid at about 130 degrees centigrade which results in the formation of α,β-dichloro-γ,γ,γ-trifluorocrotonic acid as exemplified by the following equation:

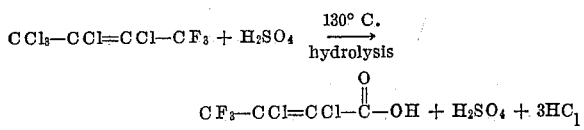

This compound is then utilized in making the derivatives, as exemplified hereinafter which are embraced within the scope of our invention as stated in the above generic formula.

The following examples are given to illustrate this invention further although they are not to be construed as limiting the invention except as defined in the claims.

Example 1.—Preparation of 1,1,1,2,3-pentachloro-4,4,4-trifluorobutene-2

One - thousand - three hundred - ninety - eight grams (6 moles) of 2,3-dichloro-1,1,1,4,4,4-hexafluorobutene-2, prepared in a manner after that described in 2,436,357 and having a boiling point of 66 to 67 degrees centigrade, was charged into a three liter three-necked flask, equipped with a reflux condenser, heating and/or cooling means, and an agitator. The charge was heated to a temperature of approximately 60 degrees centigrade, then 933 grams (7 moles) of anhydrous aluminum chloride was added in 50 gram portions over a time period of approximately 9 hours. After all of the aluminum chloride was charged, the temperature of the reaction mixture reached approximately 95 degrees centigrade. At this stage, the reaction mixture was agitated and refluxed for an additional 3 hours, whereupon a maximum reaction temperature of about 106 degrees centigrade was attained.

As the reaction progressed, the color of the aluminum chloride-chlorofluorocarbon mixture changed from white to yellow and finally to a brownish-green color. The refluxing was stopped at this point. After cooling to room temperature, the contents of the reaction flask were filtered under suction while the filter flask was immersed in an ice-bath. The resultant precipitate which consisted of aluminum fluoride, unreacted aluminum chloride and an aluminum chlorofluoro complex was decomposed by slurrying in cold dilute hydrochloric acid whereupon a two-layer solution was produced. Steam distillation of the bottom layer gave additional organic material which after washing with dilute hydrochloric acid was combined with the original filtrate. The organic materials were combined and then washed twice with water and dried. Fractionation of the material gave 882 grams of a material possessing a boiling point range of between about 176 and about 181 degrees centigrade. This material was analyzed and found to possess a chlorine content of 63.4 percent by weight and a molecular weight of 278, which corresponds to 1,1,1,2,3-pentachloro-4,4,4-trifluorobutene-2 having a theoretical chlorine content of 62.9 percent by weight and a theoretical molecular weight of 282.

Example 2.—Preparation of α,β-dichloro-γ,γ,γ-trifluorocrotonic acid

A mixture of 1,412 grams (5 moles) of 1,1,1,2,3-pentachloro-4,4,4-trifluorobutene-2, prepared as in Example 1, and 1,567 grams (16 moles) of concentrated sulfuric acid was charged to a three liter, three-necked flask equipped with agitator, heating mantle, reflux condenser and thermometer. The charge was agitated and gradually heated to a temperature of about 130 degrees centigrade, at which point the reaction mixture temperature was held constant for a period of about 10 hours, during which time hydrogen chloride was evolved. The reaction mixture was then cooled to room temperature after which the drop-wise addition of 500 milliliters of cold water was effected, resulting in further evolution of additional hydrogen chloride. At this point, the reaction mixture contained two liquid phases, an aqueous lower layer and an organic upper layer. The organic material was separated from the bottom layer, washed once with cold water and neutralized with 10 percent sodium hydroxide solution. The neutralization effected the solution of the product, α,β-dichloro-γ,γ,γ-trifluorocrotonic acid, and left insoluble, unreacted halocarbon which was separated from the alkaline solution. Acidification of the alkaline solution of the haloacid with a large excess of concentrated hydrochloric acid, produced a mixture of two liquid phases. The lower layer containing α,β-dichloro-γ,γ,γ-trifluorocrotonic acid was taken up in 200 milliliters of diethyl-ether and was washed with three 150 milliliter portions of cold water to remove any dissolved hydrogen chloride. After drying, the ether and any low boiling materials were removed by fractionation at atmospheric pressure up to a bath temperature of 100 degrees centigrade. The fractionation was continued under a pressure of 11 millimeters mercury to yield 780 grams of a material possessing a boiling point range of 83 to 85 degrees centigrade.

Ether extraction of the sulfuric acid layer from the reaction mixture resulted in the recovery of an additional 81.4 grams of material. This material was analyzed and found to possess a chlorine content of 33.94 and 33.54 percent by weight, which corresponds to α,β-dichloro-γ,γ,γ-trifluorocrotonic acid possessing a theoretical chlorine content of 33.94 percent. A total of 861 grams of acid was obtained which represents a theoretical yield of 82.4 percent.

*Example 3.—Preparation of the acid chloride of α,β-dichloro-γ,γ,γ-trifluorocrotonic acid*

A one liter, three-necked flask equipped with an agitator, dropping funnel and a condenser was charged with 313.5 grams (1.5 moles) of dichlorotrifluorocrotonic acid. The reaction flask was heated to 135 degrees centigrade and 391 grams (2.0 moles) benzotrichloride was added over an elapsed time of one-half hour. As the dichlorotrifluorochrotonyl chloride was formed it was slowly removed by continuous distillation through an air condenser. The temperature of the reaction was gradually raised to 170 degrees centigrade and held there for one-half hour. The crude product was fractionated to yield 281 grams of the chloride with a boiling point range of 113 to 115 degrees centigrade. A yield of 82.3 percent was obtained. Chlorine analysis gave weight percentages of 46.59 and 46.74 compared to the theoretical value of 46.77.

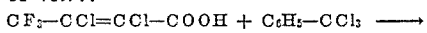

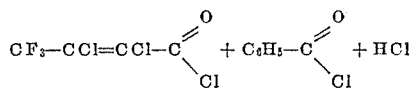

*Example 4.—Preparation of the acid anhydride of α,β-dichloro-γ,γ,γ-trifluorocrotonic acid*

A total of 104.5 grams (0.5 mole) of dichlorotrifluorocrotonic acid and 71 grams (0.5 mole) of phosphorus pentoxide was charged to and was well mixed in a reaction flask equipped with a distillation condenser. The reaction mixture was slowly heated and the anhydride distilled at a pressure of 12 millimeters mercury at a temperature of 95 to 106 degrees centigrade. This distillate was mixed in a reaction flask with 15 grams of phosphorus pentoxide and refractionated. The fraction obtained at a boiling point of 103 to 104 degrees centigrade at 11 millimeters of mercury pressure was equal to 55 grams representing a 55 percent theoretical yield. Chlorine analysis of this fraction gave values of 35.62 and 35.62 percent by weight chlorine compared to a theoretical value of 35.50.

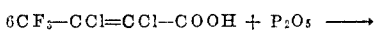

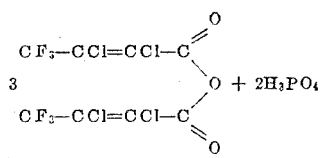

The physical properties of the compounds prepared in the following examples are given in the data tables which follow the general type derivatives specifically exemplified and are identified in the table by example number.

*Example 5.—Preparation of the salts of α,β-dichloro-γ,γ,γ-trifluorocrotonic acid*

A total of 4.18 grams (0.02 mole) of dichlorotrifluorocrotonic acid dissolved in 5 milliliters of water was charged to 100 milliliter round bottom flask followed by the addition of 0.73 gram (0.01 mole) lithium carbonate. The mixture was gradually heated to 90 degrees centigrade with stirring. The lithium salt was recovered from the aqueous solution by evaporation. Final traces of water were removed by azeotropic distillation with benzene. A total of 5 grams of dry lithium dichlorotrifluorocrotonate was obtained.

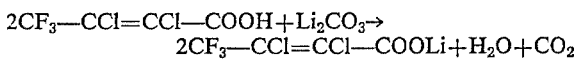

*Example 6*

A solution of 10.45 grams (0.05 mole) dichlorotrifluorocrotonic acid and 10 milliliters of water was charged to 100 milliliter reaction flask, followed by 3.1 grams (0.025 mole) of sodium carbonate monohydrate. The reaction mixture was heated to 55 degrees centigrade for several minutes with swirling to insure complete reaction. The aqueous reaction media was removed by distillation at 60 degrees centigrade under 15 millimeters of mercury pressure. The wet sodium salt was dried at 100 degrees centigrade for one hour. A total of 10.9 grams of sodium dichlorotrifluorocrotonate was obtained. The sodium salt had a grease-like feel.

The physical properties of the compounds prepared in Examples 5 and 6 and properties of additional prepared salts are contained in Table I.

*Example 7.—Preparation of the esters of α,β-dichloro-γ,γ,γ-trifluorocrotonic acid*

A total of 11.4 grams (0.05 mole) of dichlorotrifluorocrotonyl chloride was charged to a 250 milliliter three-neck flask, equipped with a stirrer, a reflux condenser and a dropping funnel. Addition of 32 grams (1 mole) of methanol caused the temperature to rise above room temperature whereupon external heat was applied to raise the temperature to 65 degrees centigrade. The reaction mixture was cooled and poured into cool water. The resulting crude ester was dried and then distilled at 743 millimeters pressure, 8 grams of the methyl dichlorotrifluorocrotonate was recovered.

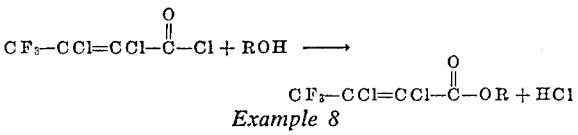

*Example 8*

A mixture of 22.8 grams (0.1 mole) of dichlorotrifluorocrotonyl chloride and 15 grams (0.15 mole) of 2,2,2-trifluoroethanol was refluxed for 30 minutes. Then, a total of 25 grams (0.2 mole) of dimethylaniline was added to the cooled reaction flask. The reaction mixture was heated to 60 degrees centigrade, cooled, washed with a 10 percent hydrogen chloride solution and then washed twice with water. After drying the crude ester, distillation at 735 millimeters pressure resulted in 12 grams of trifluoroethyl dichlorotrifluorocrotonate.

*Example 9*

To a 100 milliliter round-bottom flask fitted with a reflux condenser, there was charged 11.4 grams (0.05 mole) of dichlorotrifluorocrotonyl chloride, 11.1 grams (0.15 mole) of tertiary butyl alcohol and 18 grams (0.15 mole) of dimethylaniline. This mixture was refluxed for three hours, cooled and then poured into water. A crude ester was separated from the resulting organic layer and washed and then dried over anhydrous calcium chloride. After removal of the ether by distillation, the ester was fractionated at 12 millimeters pressure resulting in 4 grams of tertiary butyl dichlorotrifluorocrotonate.

TABLE I.—SALTS OF α, β-DICHLORO-γ, γ, γ-TRIFLUOROCROTONIC ACID

| Example No. | Name | Structure | Mol. Wt. | Percent Cl Theory | Percent Cl Found | Percent Yield |
|---|---|---|---|---|---|---|
| 5 | Lithium | CF₃—CCl—CCl—COOLi | 214.9 | 33.01 | 32.53/32.64 | 93.0 |
| 6 | Sodium | CF₃—CCl—CCl—COONa | 231.0 | 30.71 | 30.27/30.33 | 94.4 |
| 5a | Potassium | CF₃—CCl—CCl—COOK | 247.1 | 28.74 | 28.69/28.70 | 85.0 |
| 5b | Calcium | (CF₃—CCl—CCl—COO)₂Ca | 456.1 | 31.10 | 30.01/30.09 | 85.5 |
| 5c | Barium | (CF₃—CCl—CCl—COO)₂Ba | 553.4 | 25.66 | 25.42/24.98 | 94.0 |

5a, 5b, 5c—Prepared in a manner after Example 5.

Example 10

A solution of 11.4 grams (0.05 mole) dichlorotrifluorocrotonyl chloride was charged to a 100 milliliter round-bottom flask, followed by 12 grams (0.2 mole) of allyl alcohol. After heating this reaction mixture to 80 degrees centigrade for 10 minutes, it was cooled and poured into water. The resulting organic material was separated and washed and then dried. After removal of the ether by distillation, the crude ester was fractionated at 743 millimeters mercury pressure, resulted in 6 grams of allyl dichlorotrifluorocrotonate.

Example 11

A solution of 11.4 grams (0.05 mole) of dichlorotrifluorocrotonyl chloride was charged into a 100 milliliter round-bottom flask followed by 6 grams (0.17 mole) tetrahydrofurfuryl alcohol. This mixture was heated to 90 degrees centigrade for 30 minutes. The product was washed and dried. Distillation at 30 millimeters mercury pressure produced 8 grams of tetrahydrofurfuryl dichlorotrifluorocrotonate.

Example 12

A solution of 11.4 grams (0.05 mole) of dichlorotrifluorocrotonyl chloride and 7 grams (0.07 mole) of phenol was refluxed for one hour. The mixture was cooled and 13 grams (0.1 mole) of dimethyl aniline added. After heating up to 190 degrees centigrade, the mixture was cooled to room temperature, washed with two portions of a 10 percent sulfuric acid solution, followed by two portions of aqueous potassium carbonate solution. The material was dried over anhydrous calcium chloride. Distillation at 13 millimeters mercury pressure produced 7 grams of phenyl dichlorotrifluorocrotonate.

Example 13

A solution of 11.4 grams (0.05 mole) of dichlorotrifluorocrotonyl chloride was reacted with 5.7 grams (0.05 mole) of methylcyclohexanol. After heating the mixture to 100 degrees centigrade for 1 hour, it was cooled and poured into water. The resulting organic layer was dissolved in 30 milliliters of ether, washed with an aqueous potassium carbonate solution, followed by two portions of water and then dried over anhydrous calcium chloride. Distillation at 2.2 millimeters mercury pressure resulted in 7 grams of methylcyclohexyl dichlorotrifluorocrotonate.

Example 14

To a 250 milliliter reaction flask equipped with a reflux condenser there was charged 11.4 grams (0.05 mole) of dichlorotrifluorocrotonyl chloride and 1.55 grams (0.025 mole) of ethylene glycol. This mixture was refluxed for one hour. During that period the reaction temperature increased from 117 to 170 degrees centigrade. The crude solution was dissolved in ether, and was washed and then was dried. After drying, the ether was removed by distillation. Fractionation of the remainder at 22 millimeters mercury pressure resulted in 9 grams of ethylene glycol bis-(dichlorotrifluorocrotonate).

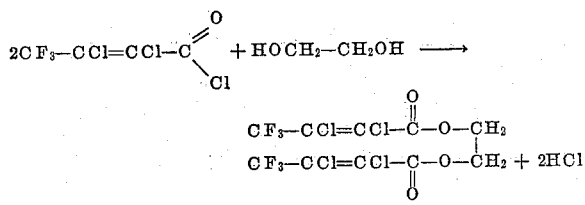

Example 15

To a 250 milliliter reaction flask fitted with a reflux condenser there was charged 11.4 grams (0.05 mole) of dichlorotrifluorocrotonyl chloride and 2.25 grams (0.025 mole) of 1,4-butanediol. The reaction flask and its contents were heated to 120 degrees centigrade at which point a rapid evolution of hydrogen chloride started. The mixture was kept at 120 degrees centigrade for an additional 30 minutes. After cooling and dissolving in ether, the resulting solution was washed and dried. After removal of the ether by distillation, the crude ester was fractionated at three millimeters mercury pressure resulting in 5 grams of 1,4-butanediol bis-(dichlorotrifluorocrotonyl).

Example 16

A solution of 13.0 (0.057 mole) of dichlorotrifluorocrotonyl chloride and 2.65 grams (0.05 mole) of diethylene glycol were refluxed for 45 minutes. The reaction mixture was cooled, dissolved in 30 milliliters of ether and then dried. The ether was removed by distillation. Fractionation of the crude ester at 13 millimeters mercury pressure resulted in 6 grams of diethylene glycol bis-(dichlorotrifluorocrotonate).

The physical properties of the compounds prepared in Examples 7–16 respectively and of additional compounds are contained in Tables II and III.

*Example 17.—Preparation of the amides of α,β-dichloro-γ,γ,γ-trifluorocrotonic acid*

A total of 11.4 grams (0.05 mole) of α,β-dichloro-γ,γ,γ-trifluorocrotonyl chloride was added dropwise to 50 milliliters of a stirred 5 molar solution of ammonium hydroxide. The amide precipitated from the solution in white crystals and was filtered. After washing with several portions of water, the α,β-dichloro-γ,γ,γ-trifluorocrotonamide was recrystallized from an equal mixture of water and ethyl alcohol. Drying for two hours in a dessicator over phosphorus pentoxide, produced 9.3 grams of the amide.

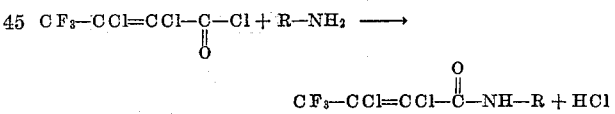

Example 18

A solution of 10.1 grams (0.1 mole) of diisopropyl amine in 40 milliliters of benzene was charged to a 250 milliliter reaction flask fitted with an agitator and a dropping funnel. To the reaction flask there was added 11.4 grams (0.05 mole) of dichlorotrifluorocrotonyl chloride, with cooling. The resultant yellow reaction mixture was washed with dilute acid followed by water washings. After drying, the product was distilled at 26 millimeters mercury pressure and resulted in 9 grams of N,N-diisopropyl α,β-dichloro-γ,γ,γ-trifluorocrotonamide.

Example 19

A solution of 11.4 grams (0.05 mole) of dichlorotrifluorocrotonyl chloride dissolved in 20 milliliters of benzene was charged to a 250 milliliter round bottom flask fitted with an agitator and a dropping funnel, whereupon 1.2 grams (0.02 mole) of ethylene diamine dissolved in 20 milliliters of benzene, was added slowly. The resulting precipitate was filtered and washed with dilute acid, followed by water washing. The crude amide, 7 grams of N,N'-bis-(dichlorotrifluorocrotonyl) ethylenediamide was recrystallized from ethanol and then dried.

TABLE II.—ESTERS OF α,β-DICHLORO-γ,γ,γ-TRIFLUOROCROTONIC ACID

| Example No. | Name | Mol. Weight | Percent Cl Theory | Percent Cl Found | B. P., °C. | $n_D^{20}$ | Percent Yield |
|---|---|---|---|---|---|---|---|
| 7 | Methyl | 223 | 31.84 | 31.31/31.53 | 141-43°/743 | 1.4103 | 71.4 |
| 7a | Ethyl | 237 | 29.96 | 29.79/29.83 | 155-56°/742 | 1.4108 | 75.6 |
| 7b | n-Butyl | 265 | 26.80 | 26.49/26.48 | 193°/746 | 1.4188 | 60.1 |
| 7c | n-Amyl | 279 | 25.45 | 25.00/24.92 | 207-10°/746 | 1.4221 | 89.2 |
| 7d | n-Octyl | 321 | 22.10 | 21.69/21.50 | 134°/13 | 1.4310 | 49.6 |
| 7e | Isopropyl | 251 | 28.29 | 27.93/28.03 | 165° | 1.4097 | 82.5 |
| 8 | Trifluoroethyl | 291 | 24.40 | 24.1/24.7 | 145-6°/735 | 1.3780 | 82.1 |
| 9 | Tertiary Butyl | 265 | 26.80 | 26.86/27.18 | 65-6°/12 | 1.4122 | 30.2 |
| 10 | Allyl | 249 | 28.52 | 28.14/28.41 | 170-2° | 1.4264 | 42.8 |
| 11 | Tetrahydrofurfuryl | 293 | 24.23 | 24.26/24.08 | 143-5°/30 | 1.4457 | 54.6 |
| 12 | Phenyl | 285 | 24.92 | 24.47/24.50 | 113-5°/13 | 1.4832 | 48.9 |
| 12a | Cyclohexyl | 291 | 24.40 | 23.98/24.16 | 75-7°/2.5 | 1.4468 | 68.4 |
| 13 | Methylcyclohexyl | 305 | 23.28 | 23.26/23.30 | 79-81°/2.2 | 1.4460 | 45.7 |

7a, 7b, 7c, 7d, 7e—Prepared in a manner after Example 7.
12a—Prepared in a manner after Example 12.

TABLE III.—DIESTERS OF α,β-DICHLORO-γ,γ,γ-TRIFLUOROCROTONIC ACID

| Example No. | Name | Mol. Weight | Percent Cl Theory | Percent Cl Found | B. P., °C. | $n_D^{20}$ | Percent Yield |
|---|---|---|---|---|---|---|---|
| 14 | Ethylene glycol | 444 | 31.99 | 31.53/32.28 | 163-4°/22 mm | 1.4410 | 80.7 |
| 14a | Propylene glycol | 458 | 31.00 | 30.00/30.34 | 159°/13 mm | 1.4396 | 56.5 |
| 15 | 1,4 Butanediol | 472 | 30.09 | 29.55/29.46 | 148-56°/3 mm | 1.4439 | 42.2 |
| 16 | Diethylene glycol | 488 | 29.10 | 28.73/28.95 | 189-90°/13 mm | 1.4446 | 42.9 |

14a—Prepared in a manner after Example 14.

The physical properties of the compounds prepared in Examples 17–19 respectively and of additional compounds are contained in Table IV.

*Example 20.—Preparation of the nitriles of α,β-dichloro-γ,γ,γ-trifluorocrotonic acid*

A total of 31.2 grams (0.15 mole) of dichlorotrifluorocrotonamide was intimately mixed with 42.6 grams (0.3 mole) of phosphorus pentoxide and was charged to a reaction flask equipped with an agitator and with a simple distillation device. The mixture was heated slowly until the reaction mass had become partially molten. The agitator was started and while heating was continued, the nitrile distilled over at 108 degrees centigrade. After twenty minutes, and the nitrile ceased distilling, the reaction apparatus was placed under mild vacuum and additional quantities of product were obtained. A total of 24.5 grams of water-white liquid was obtained, which upon redistillation at 738 millimeters of mercury, gave the following fractions: 2 grams at 106 to 107 degrees centigrade; 11.5 grams at 107 to 108 degrees centigrade; and 7.3 grams at above 108 degrees centigrade. Chlorine analysis of the 107–108 degrees centigrade boiling material gave values of 37.23 and 37.11 percent by weight compared to the theoretical value of 37.33 percent.

The equation for the preparation of the product can be depicted as follows:

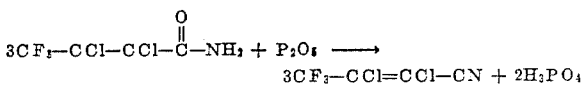

$$3CF_3-CCl-CCl-C(=O)-NH_2 + P_2O_5 \longrightarrow 3CF_3-CCl=CCl-CN + 2H_3PO_4$$

In the foregoing examples we have exemplified our invention by using α,β-dichloro-γ,γ,γ-trifluorocrotonic acid where the $CF_3$ group represents the perhalocarbon radical designated as "R" in the general class formula R—CCl=CCl—Z. In place of the $CF_3$ group, any perhalo group unreactive with sulfuric acid, may be employed to obtain the acid corresponding thereto.

The reactants which are useful in the preparation of the esters of this invention are alcohols and other compounds containing the OH group, such as phenols; for

TABLE IV.—AMIDES OF α,β-DICHLORO-γ,γ,γ-TRIFLUOROCROTONIC ACID

| Example No. | Name | Mol. Weight | Percent Cl Theory | Percent Cl Found | B. P., °C. | $n_D^{20}$ | Percent Yield |
|---|---|---|---|---|---|---|---|
| 17 | Amide | 208 | 34.14 | 34.05/33.81 | M. P. 123-4° | | 89.1 |
| 17a | n-Butyl | 264 | 26.89 | 26.69/26.45 | 167-8/30 mm | 1.4465 | 87.9 |
| 17b | β-Phenylethyl | 312 | 22.76 | 22.41/22.49 | M. P. 97-8° | | 44.7 |
| 18 | Diisopropyl | 292 | 24.32 | 24.29/24.11 | 134-6/26 mm | 1.4462 | 61.6 |
| 18a | Di-n-butyl | 320 | 22.19 | 22.11/22.03 | | 1.4510 | 67.0 |
| 18b | Anilide | 284 | 25.00 | 24.70/24.88 | M. P. 102-8° | | 84.1 |
| 19 | Diamide of Ethylenediamine | 442 | 32.13 | 31.74/32.00 | M. P. 241-2 | | 63.3 |

17a, 17b—Prepared in a manner after Example 17.
18a, 18b—Prepared in a manner after Example 18.

example, methyl, ethyl, n-propyl, isopropyl, isobutyl, secondary butyl, tertiary butyl, n-amyl, active amyl, neopentyl, n-hexyl, 2-methyl-1-pentanol, 4-methyl-1-pentanol, 2,2-dimethyl butane-1-ol, 2,2-dimethyl-1-butanol, 3-hexanol, 3-methyl-2-pentanol, ethyl isopropyl carbinol, pinacolyl alcohol, 2,3,3-trimethyl-2-butanol, n-octyl, allyl, methyl vinyl carbinol, crotyl, 1-butene-4-ol, propargyl, glycolic aldehyde, glycolic acid, propylene glycol, trimethylene glycol, 2,3-butanediol, isobutylene glycol, 1,5-pentanediol, ethylene chlorohydrin, 1 - chloro - 2 - propanol dichloroethanol, monofluoroethanol, trifluoroethanol, bromoethanol, iodo ethanol, ethanol amine, glycerine, pentaerythritol, trimethylol propane, isoborneol, phenol, orthochlorophenol, 2,4,6-trichlorophenol, m-cresol, thymol, b-naphthol, o-nitrophenol, p-iodophenol, thiophenol, resorcinol, pyrogallol, benzyl, phenyl ethyl, omega-phenyl propyl alcohol, 1,4-butene diol, 1,4-butynediol, 2-methylcyclopentanol, cyclohexanol, 3-methylcyclohexanol, furfuryl alcohol, tetrahydrofurfuryl alcohol, 2,2,3,3,4,4,5,5-octafluorohexanediol, 2,2,3,3,4,4 - hexafluoropentanediol, 1,1-dihydroperfluorobutyl alcohol and cinnamyl etc.

Some amines which are useful in the preparation of the amides of this invention are as follows: methyl, ethyl, butyl, hexyl, octyl, vinyl, allyl, dimethyl, diethyl, di-n-heptyl, di-n-nonyl, di-n-decyl, di-vinyl, diallyl, cyclohexyl, b-phenyl ethyl, ethylene diamine, aniline, methyl aniline, 1,2,3-triaminobenzene, 1,2,4-triaminobenzene, 2,3,5-triaminobenzoic acid, 2-aminobenzoic acid and tetraethylene penta-amine.

The $\alpha,\beta$-dichloro-$\gamma,\gamma,\gamma$-trifluorocrotonic acid and its ethyl ester of this invention are particularly useful for the elimination of internal parasites from the alimentary tract of animals, i. e., they are anthelmintic agents. For example, when an anthelmintic feed composition containing $\alpha,\beta$-dichloro-$\gamma,\gamma,\gamma$-trifluorocrotonic acid as its only active ingredient, in proportions such that an adequate dose is obtained by poultry consuming the material placed in their food, such as between one-tenth and ten percent by weight of mash, it is found that parasites, particularly round worms of the Ascaridae family, are effectively eliminated from the poultry consuming such specially prepared food. Likewise, similar results are obtained by employing the ethyl ester of $\alpha,\beta$-dichloro-$\gamma,\gamma,\gamma$-trifluorocrotonic acid, instead of the acid itself.

The $\alpha,\beta$-dichloro-$\gamma,\gamma,\gamma$-trifluorocrotonic acid of this invention and their corresponding derivatives such as the salts, esters, amides and nitriles have utility as chemical intermediates and are particularly useful as synthetic intermediates for the production of other perhalocarbon derivatives of relatively low molecular weight and as monomers in polymerization reactions to form materials of relatively high molecular weight which, because of high halogen contact, increase fire resistance. The linking of a monocarboxyl radical or a carbon-containing derivative radical hydrolyzable thereto, to a fluorocarbon chain by a chlorinated ethylene group enhances the stability, reactivity and solubility of the resulting compounds. The salts of the $\alpha,\beta$-dichloro-$\gamma,\gamma,\gamma$-trifluorocrotonic acid may be used as thickening agents in greases where chemical resistance is of prime importance. For example, the salts of this invention may be used as thickening agents in chlorotrifluoroethylene polymer preparations used as lubricants for equipment used in contact with nitric acid. The amides may be dehydrated to produce fluorinated acrylonitriles which are capable of forming ethers by direct addition of an alcohol to the double bond. Furthermore, chlorofluoroamides embraced within the scope of this invention have insect repelling properties and may be incorporated in paper, fabrics and sheet material to impart insect repellent properties. One method which may be employed is to dissolve the amide in a solvent of low vapor pressure whereby the sheet material may be conveniently impregnated. Alternatively, a suspension may be employed. The $\alpha,\beta$-unsaturated nitriles of this invention are valuable in the manufacture of synthetic resins and rubber.

It is to be understood that the invention is not limited to the specific examples which have been offered merely as illustrative and that modifications may be made within the scope of the appended claims without departing from the spirit of the invention.

We claim:
1. Compounds selected from the group consisting of: $\alpha,\beta$-dichloro-$\gamma,\gamma,\gamma$-trifluorocrotonic acid; the acid anhydride thereof; the acid halide thereof; the alkali and alkaline earth metal salts thereof; the nitrile thereof; the $N(R)_2$ amides thereof wherein R is selected from the group consisting of hydrogen, lower alkyl, phenyl, phenyl-lower alkyl and ethyleneamino N-$\alpha,\beta$-dichloro-$\gamma,\gamma,\gamma$-trifluorocrotonyl; and esters of said acid and mono and dihydric alcohols wherein the alcohol portion of said esters contains from 1 to 8 carbon atoms and wherein the elements of the alcohol portion of said esters are selected from the groups consisting of fluorine, carbon, hydrogen and oxygen; and carbon, hydrogen and oxygen.

2. $\alpha,\beta$-Dichloro-$\gamma,\gamma,\gamma$-trifluorocrotonic acid.

3. Alkali and alkaline earth metal salts of $\alpha,\beta$-dichloro-$\gamma,\gamma,\gamma$-trifluorocrotonic acid.

4. Esters of mono and dihydric alcohols and $\alpha,\beta$-dichloro-$\gamma,\gamma,\gamma$-trifluorocrotonic acid wherein the alcohol portion of said esters contains from 1 to 8 carbon atoms and wherein the elements of the alcohol portion of said esters are selected from the groups consisting of fluorine, carbon, hydrogen and oxygen; and carbon, hydrogen and oxygen.

5. $N(R)_2$ amides of $\alpha,\beta$-dichloro-$\gamma,\gamma,\gamma$-trifluorocrotonic acid wherein R is selected from the group consisting of hydrogen, lower alkyl, phenyl, phenyl-lower alkyl and ethyleneamino N-$\alpha,\beta$-dichloro-$\gamma,\gamma,\gamma$-trifluorocrotonyl.

6. Nitrile of $\alpha,\beta$-dichloro-$\gamma,\gamma,\gamma$-trifluorocotonic acid.

References Cited in the file of this patent

UNITED STATES PATENTS 2,730,543    Rendall et al. _____ Jan. 10, 1956

OTHER REFERENCES

Walborsky et al.: J. Am. Chem. Soc. 75 (1953), 3241–3.

Henne et al.: J. Am. Chem. Soc. 76 (1954), 479–81.

UNITED STATES PATENT OFFICE
CERTIFICATE OF CORRECTION

Patent No. 2,863,906                        December 9, 1958

Charles F. Baranauckas et al.

It is hereby certified that error appears in the printed specification of the above numbered patent requiring correction and that the said Letters Patent should read as corrected below.

Column 1, line 47, for the extreme right-hand portion of the formula reading "$3HC_1$" read — $3HCl$ —; column 7, Table IV, Example 19, second column thereof, last line, for "9enediamine" read — enediamine —; column 10, line 38, for "-trifluorocotonic acid" read — -trifluorocrotonic acid —.

Signed and sealed this 26th day of April 1960.

(SEAL)
Attest:

KARL H. AXLINE                                      ROBERT C. WATSON
Attesting Officer                                  Commissioner of Patents